Oct. 20, 1931.   G. F. DRIEMEYER   1,827,975
ELECTRIC MOTOR TRUCK
Filed Jan. 30, 1929   2 Sheets-Sheet 1
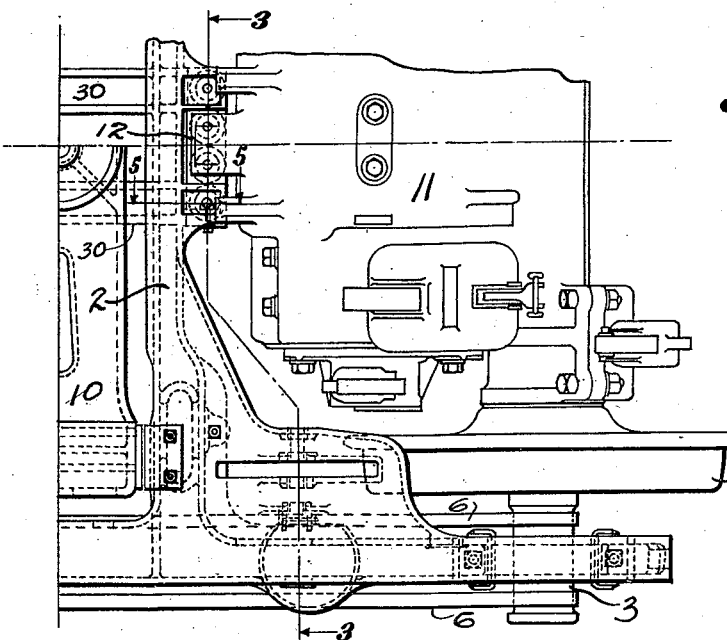
Fig·1·
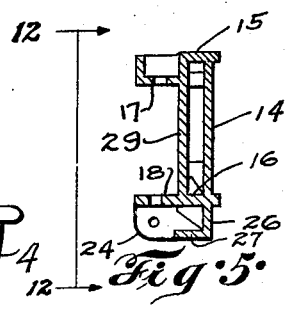
Fig·5·
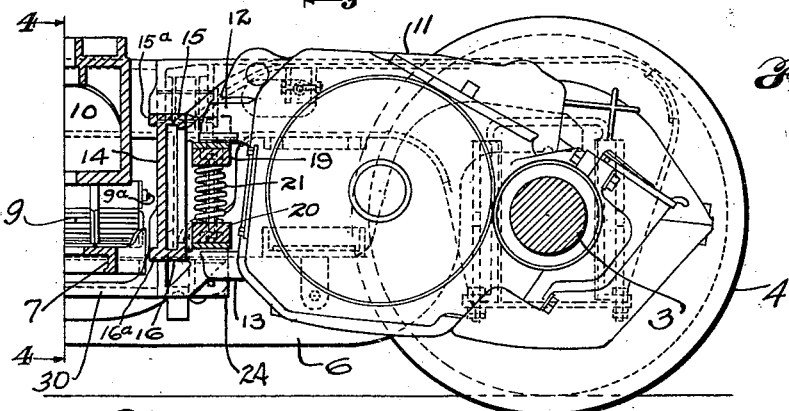
Fig·2·
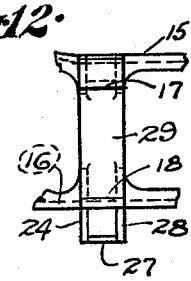
Fig·12·
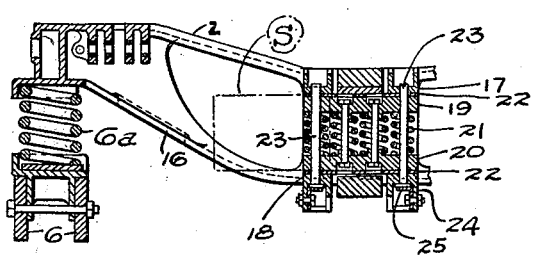
Fig·3·
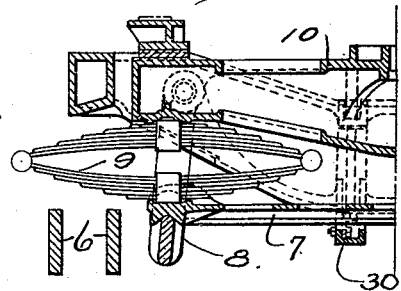
Fig·4·
Inventor
George Fred Driemeyer
By Rodney Bedell
Attorney Oct. 20, 1931.    G. F. DRIEMEYER    1,827,975
ELECTRIC MOTOR TRUCK
Filed Jan. 30, 1929    2 Sheets-Sheet 2
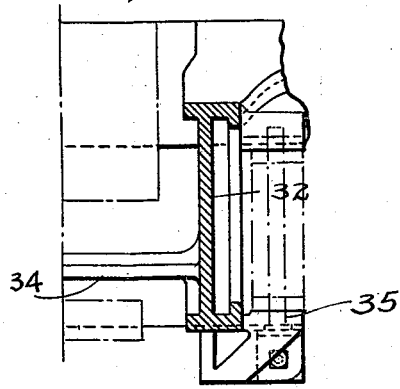
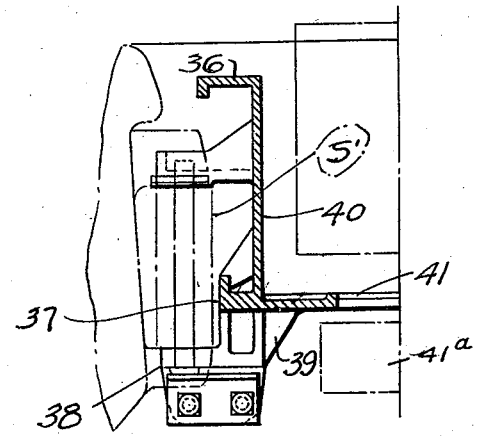
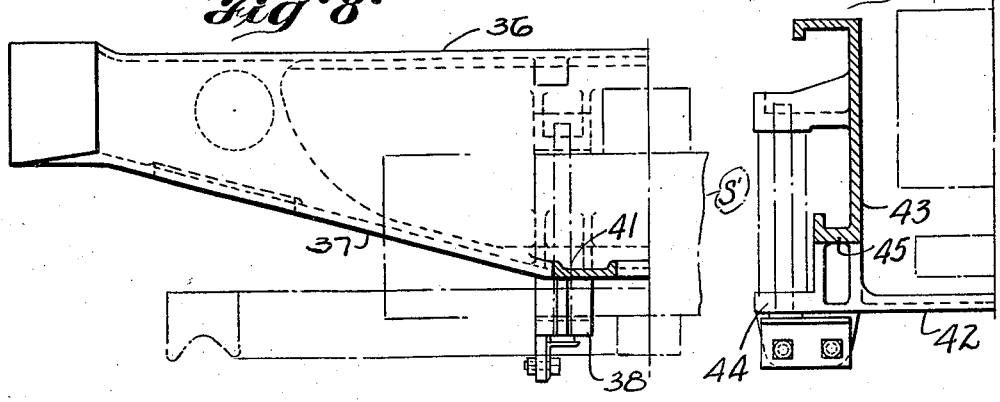
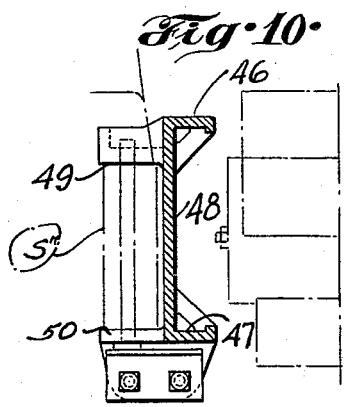
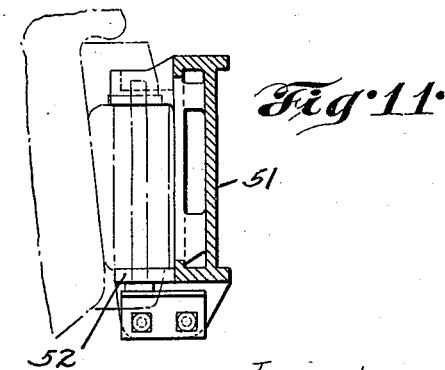
Inventor
George Fred Driemeyer
By Rodney Bedell
Attorney Patented Oct. 20, 1931

1,827,975

UNITED STATES PATENT OFFICE

GEORGE FRED DRIEMEYER, OF ST. LOUIS, MISSOURI, ASSIGNOR, BY MESNE ASSIGNMENTS, TO GENERAL STEEL CASTINGS CORPORATION, OF GRANITE CITY, ILLINOIS, A CORPORATION OF DELAWARE

ELECTRIC MOTOR TRUCK

Application filed January 30, 1929. Serial No. 336,256.

My invention relates to railway rolling stock and consists in a novel truck frame construction and arrangement of associated parts.

My invention is particularly adapted for embodiment in a four wheel truck in which the transoms mount one end of electric motors also carried in part by the truck axles and in which a relatively movable bolster is positioned between the transoms.

The objects of my invention are to provide, in a truck of this type, for the efficient mounting of the motor on the truck transom with due regard for the necessary clearances for the movement of the bolster, for the application and removal of the motor and its yielding support elements and for the provision of suitable transom reinforcing members.

In the accompanying drawings which illustrate my invention—

Figure 1 is a top view of approximately one quarter of a motor truck of the type described, it being understood that the other side and end of the truck will be duplicates of that shown.

Figure 2 is a vertical section through the truck taken on the longitudinal center line of the same.

Figure 3 is a vertical transverse section taken on the line 3—3 of Figure 1.

Figure 4 is a vertical section taken on the transverse center line of the truck as indicated at 4—4 in Figure 2.

Figure 5 is a detail vertical section taken on the line 5—5 of Figure 1.

Figure 6 is a detail section and view of a modified structure.

Figure 7 is a similar view of another modified structure.

Figure 8 is an elevation of the structure shown in Figure 7.

Figures 9, 10 and 11 correspond to Figures 6 and 7 but illustrate other modifications.

Figure 12 is a front view of the structure shown in Figure 5 and is taken approximately on line 12—12 of the latter.

In the truck illustrated in Figures 1 to 5, inclusive, and 12, the truck frame includes wheel pieces 1 and transoms 2 and this frame will be mounted upon the axles 3 and wheels 4 through journal boxes (not shown) and equalizers 6 and springs 6$^a$ in any well-known manner. A spring plank 7 is suspended from transoms 2 by links 8 and carries springs 9 upon which the bolster 10 is supported in the usual manner. A motor frame 11 is mounted on the axle 3 at one end and at its opposite end is provided with lugs 12 and 13 which are mounted on the transom 2 through the elements described below.

Preferably, each transom 2 comprises a vertical web 14 having upper and lower flanges 15 and 16, respectively, extending horizontally on each side of the web towards the transverse center line of the truck and towards the end of the truck. The portions 15$^a$ and 16$^a$ of the top and bottom flanges 15 and 16 respectively of the transom 2 which extend toward the transverse center line of the truck, provided for a greater width of flange than the usual construction without decreasing the amount of clearance between the end of bolster spring bolt 9$^a$ and vertical web 14 and the distance between the inner edges of the opposite flanges is slightly greater than the length of the bolt to allow the latter to pass therebetween when positioning the spring 9. A plurality of brackets 17 and 18 are formed integrally with each transom and extend toward the respective axles 3 and provide upper and lower supports for the spring suspension device comprising bars 19 and 20 engaging the undersides of brackets 17 and the upper sides of brackets 18, respectively, and having coiled springs 21 compressed between them. Preferably, wear plates 22 are positioned between bars 19 and 20 and their respective brackets and suitable retaining pins 23 extend through the brackets, wear plates, bars and springs.

Bracket 18 includes a vertical member 24 extending transversely of the transom and an angle 25, serving as a keeper for pin 23, is bolted to member 24.

A reinforcement for each bracket 18 is provided by the downward extension 26 having a horizontal flange 27 on its lower end and a reinforcing rib 28 extends from the flange 27 to the bracket 18. The outer edges of the top and bottom flanges 15 and 16 are connected by a vertical tie member 29 throughout the width of each bracket.

The spaced transoms are reinforced longitudinally of the truck by tie members 30 adjacent and below each bracket 18. These tie members reinforce the transoms and prevent the lower portions of the transoms from moving out of position relative to the motor.

The advantages of the above described structure are most readily appreciated by reference to the operation of assembling and disassembling the motor and spring support with the truck frame. To assemble: The motor is held in a much higher position than that shown and is swung to the position indicated. Obviously, it could not be swung downwardly with the spring suspension device in place and during this swinging movement the spring suspension device must be moved out of vertical alignment with the motor frame lugs 12 and 13. Such position of the spring suspension device is indicated in broken lines at S in Figure 3. With the motor in its proper position, the spring suspension unit may be moved transversely of the truck into the working position in which it supports the upper lug 12 and also yieldingly resists upward movement of the lower lug 13. Such movement may be produced by jarring or by driving torque.

To disassemble the structure, the spring suspension unit is moved laterally of the truck to the position indicated at S in Figure 3; the motor is then rotated upwardly whereupon the spring suspension device may be moved lengthwise of the truck for removal therefrom.

In previous motor supports with which I am acquainted, the upper and lower flanges of the transom have projected over and beneath the motor supporting brackets and in vertical alignment with the motor spring suspension unit, and, in order to apply and remove the spring suspension unit and to provide sufficient space between the spring suspension unit and bottom flange and to allow for vertical travel of the lower motor nose, it has been necessary to make the transoms very deep and relatively heavy (with increased likelihood of weaving) so that the spring suspension unit could be moved laterally far enough to be disaligned with the motor nose, before striking the lower flange of the transom corresponding to flange 16 shown in Figure 3. With my structure, the transom is shallower and lighter, and I therefore provide for a wheelbase of minimum length in a truck having a transom of minimum depth and weight and with the motor support brackets, motor noses and spring suspension device located outside of the transom flanges. Some of the problems attending the support of the motor have been partially solved by using separate brackets riveted or bolted to the transom. However, if the separate brackets are to be applied to the bottom flange instead of to the vertical web, the flange would require a width sufficient to accommodate the rivets or bolts and as my structure provides integral brackets the width of flange is reduced to a minimum. The integral brackets eliminate the labor of assembling and the use of bolts or rivets and also avoids the necessity of frequent inspection which is necessary to maintain the rigidity of a built-up structure.

In the construction illustrated in Figure 6, the transoms 32 are shown connected by a tie member 34 located above the level of the lower bracket 35, thereby bracing the transom web intermediate its upper and lower flanges.

In the preferred structure, the upper chord of the transom is depressed near the center of the truck. In the modification illustrated in Figures 7 and 8, the top flange 36 of the transom is horizontal. The lower flange 37 therefor can be at a much higher level and spring suspension unit S' occupies a lower position relative to the transom than in the preferred form. To meet this condition, the lower bracket 38 is located below the lower flange 37 of the transom and the bracket is provided with suitable reinforcing ribs 39 extending inwardly of the transom web 40. In this form, the transom tie 41 is located at the level of the bottom flange 37 and above the spring plank 41ª.

In the modification shown in Figure 9, the cross tie 42 for the transoms 43 is located at the level of the lower bracket 44 and below the lower flange 45 of the transom.

In the modification illustrated in Figure 10, the transom flanges 46 and 47 extend inwardly from the transom web 48 towards the bolster and the brackets 49 and 50 support the spring suspension unit S'' adjacent to the web 48.

In some equipment, it may be unnecessary to provide all of the reinforcing element utilized in the preferred structure and Figure 11 illustrates a modification in which there is no cross tie or reinforcing members for the web 51 or the bracket 52.

Obviously, various other modifications in the details of my structure may be made without departing from the spirit of the invention and I contemplate the exclusive use of such variations as come within the scope of my claims.

I claim:

1. A railway truck one piece frame comprising a transom having a vertical web, integral top and bottom members extending horizontally inwardly and outwardly from both sides of said web, and an integral motor supporting bracket projecting from said transom beyond the corresponding outer edges of said members.

2. In a railway truck frame, wheel pieces, a transom between said wheel pieces and including a vertical web and integral top and bottom members extending horizontally inwardly and outwardly from said web, and a motor supporting bracket projecting from said transom and integral therewith.

3. In a railway truck, a frame including wheel pieces, an integral transom between said wheel pieces having a vertical web and having integral top and bottom members projecting horizontally inwardly and outwardly from said web, and a motor supporting bracket projecting outwardly from said transom.

4. In a railway truck, a bolster, an elliptic bolster spring, a truck frame casting including a transom, said transom having a vertical web and top and bottom flanges extending inwardly from said web toward said bolster the inner end of said bolster spring projecting beyond the plane of the side of the bolster and being located between said top and bottom flanges.

5. In a railway truck, a one piece frame provided with spaced transoms each having a vertical web and top and bottom members extending horizontally inwardly from at least one of said webs toward the longitudinal center of said frame, a movable bolster between said transoms, and a motor supporting bracket projecting outwardly from the transom having said members.

6. In a railway truck, a one piece frame provided with spaced transoms having vertical webs and top and bottom members extending horizontally inwardly from at least one of said webs toward the longitudinal center of said frame, a movable bolster between said transoms, and a motor supporting bracket integral with the transom having said members and projecting outwardly from said latter mentioned transom.

7. In a railway truck, a one piece frame including spaced transoms having vertical webs and top and bottom members extending from at least one of said webs inwardly toward the longitudinal center of said frame, a movable bolster between said transoms, and a motor support bracket element integral with and projecting outwardly from and below the bottom of the transom having said members.

8. A railway truck one piece frame including a transom having a vertical web and top and bottom flanges extending inwardly and outwardly from said web, and a motor support bracket element integral with and projecting below and outwardly from the bottom of said transom.

9. A railway truck one piece frame includin spaced transoms, each of said transoms having a vertical web and top and bottom members extending inwardly and outwardly from said web, a movable bolster between said transoms, and a motor support bracket integral with and projecting below the bottom of each of said transoms and outwardly therefrom beyond the edges of said members.

10. In a railway track, a frame including spaced transoms, each of said transoms having a vertical web and integral top and bottom flanges extending toward the longitudinal center of said frame, a motor support bracket integral with and projecting below the bottom of at least one of said transoms, a tie member extending longitudinally of said frame between said transoms intermediate the ends of the latter to rigidly hold said transoms in spaced position, and a movable holster between said transoms and above said tie member.

11. In a railway truck, a frame having spaced transoms, a bolster located between the intermediate portions of said transoms, and a tie member extending longitudinally of said frame between said transoms and integral therewith intermediate the ends of the transom, said tie member being adapted to rigidly hold said transoms in spaced position.

12. In a railway truck, a frame having wheel pieces, spaced transoms integral with said wheel pieces, a bolster located between the intermediate portions of said transoms, and a tie member extending longitudinally of said frame between said transoms and integral therewith intermediate the ends of the transom, said tie member being adapted to rigidly hold said transoms in spaced position.

13. In a railway truck, a frame having spaced transoms, a movable bolster between said transoms, a bracket element integral with each of said transoms for supporting a motor and projecting below said transoms, and a tie member extending longitudinally of said frame below said bolster and transoms and integral with said elements.

14. In a railway truck, a frame, spaced transoms, a movable bolster between said transoms, a plurality of bracket elements on each of said transoms for supporting a motor and projecting below said transoms, and a plurality of spaced tie members extending longitudinally of said frame, each tie member connecting a pair of opposite bracket elements, all of said frame parts being formed in a one piece casting.

15. In a railway truck frame, a transom having a motor support bracket element projecting outwardly and below said transom, said bracket including a downwardly projecting member adapted to mount a retainer for a spring suspension pin seated in said bracket element.

16. In a railway truck frame, a transom having a vertical web and top and bottom flanges, a motor support bracket comprising a horizontal member extending outwardly from said bottom flange; a downwardly projecting member extending below said horizontal member and below and transversely of said transom, said downwardly projecting member being adapted to mount a retainer for a spring suspension pin seated in said bracket element, all of said parts being cast integral.

17. In a railway truck frame, a transom having a vertical web and top and bottom flanges, a motor support bracket projecting outwardly and below said transom, said bracket comprising a horizontal member extending outwardly from the bottom flange, and a vertical tie member extending between the outer edges of said top and bottom flanges adjacent said bracket.

18. In a railway truck frame, a transom having a vertical web and top and bottom flanges, a motor support bracket comprising a horizontal member extending outwardly from the bottom flange, said bracket also including an angle reinforcing member having a horizontal leg spaced below the bottom of said transom, and a reinforcing rib extending from said leg to said horizontal member, all of said parts being cast integral.

19. In a railway truck frame, a transom having a vertical web and top and bottom flanges, a motor support bracket comprising a horizontal member extending outwardly from the bottom flange, a downwardly projecting member extending below said horizontal member and below and transversely of said transom, said downwardly projecting member being adapted to mount a retainer for a spring suspension pin seated in said bracket, said bracket also including an angle reinforcing member having a horizontal leg spaced below the bottom of said transom, and a reinforcing rib extending from said leg to said horizontal member, all of said parts being cast integral.

In testimony whereof I hereunto affix my signature this 14th day of January, 1929.

GEORGE FRED DRIEMEYER.